Sept. 29, 1964
J. B. REDD
3,150,981
PROCESS FOR RECOVERY OF RESIDUAL JUICE
FROM PULP OF FRUITS AND VEGETABLES
Filed Aug. 15, 1960
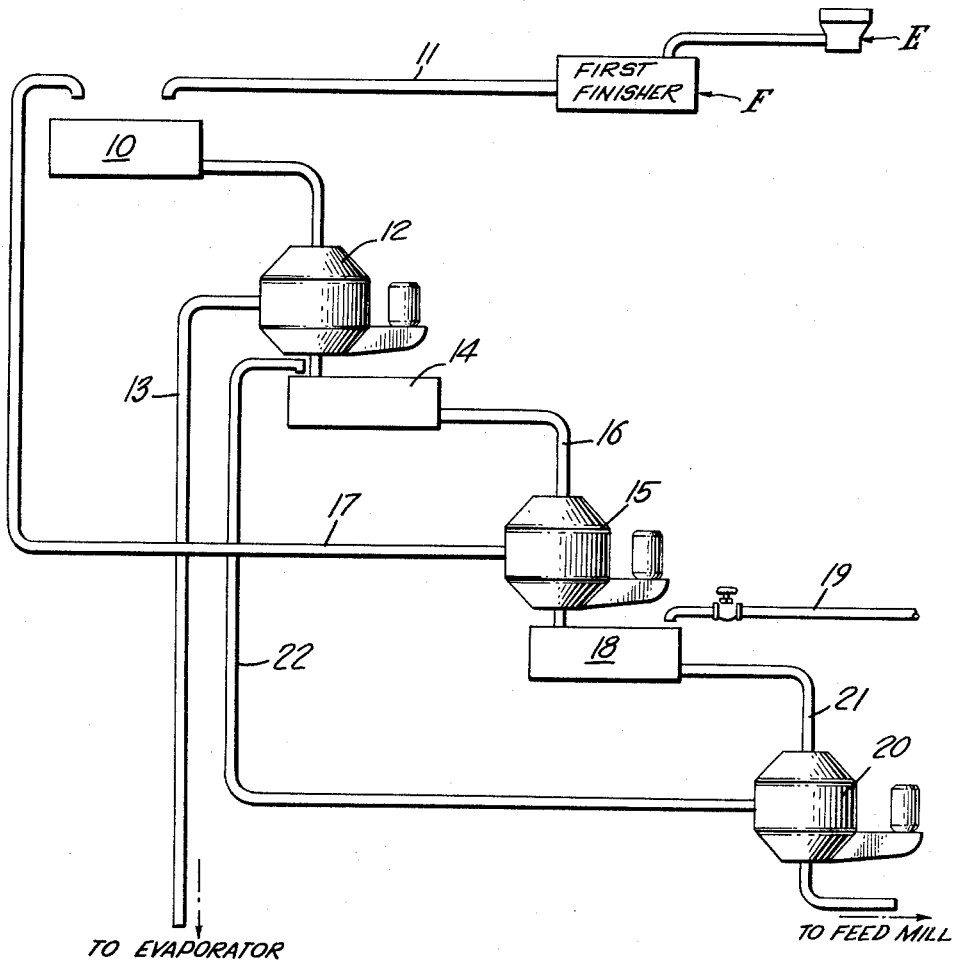
TO EVAPORATOR
TO FEED MILL
INVENTOR
*James B. Redd*
BY *Mason, Fenwick & Lawrence*
ATTORNEYS

United States Patent Office 3,150,981
Patented Sept. 29, 1964

3,150,981
PROCESS FOR RECOVERY OF RESIDUAL JUICE
FROM PULP OF FRUITS AND VEGETABLES
James B. Redd, 215 E. Yale Ave., Orlando, Fla.
Filed Aug. 15, 1960, Ser. No. 49,637
3 Claims. (Cl. 99—105)

This invention relates to a process and apparatus for the recovery of juice from fruits and vegetables, and more particularly to the recovery of juice held by capillary attraction in the "dry ball" pulp from the first finisher.

The present invention will be illustrated with respect to the recovery of orange and pineapple juice from the pulp ball of the first finisher. However, the process is applicable to the recovery of juice from the pulp of other fruits, such as, grapefruit, limes, apples, lemon and other pectin fruits. It would also be applicable to the recovery of juice from the pulp of tomatoes, carrots, spinach, and the juices.

The extractors referred to herein are of the reamers type, such as the In Line Extractor manufactured by Food Machinery Corporation.

The finisher referred to herein is a tapered screw press surrounded by a screen with holes of the order of 0.020" to 0.033". At the end of the worm, or screw, a plate is held in place by a suitable biasing means which is adjustable to change the amount of pressure exerted on the pulp. Accumulation of pulp at the end of the screw forces the plate open and the pulp is discharged. An example of such a finisher is the Model 35 Finisher manufactured by Food Machinery Corporation.

The screening centrifuge referred to herein is a through-flow centrifuge having a screen through which the juice may be forced by centrifugal action and a helix type of cleaner which may be accurately spaced from the screen, such as the Mercone "Screening" Centrifuge manufactured by Dorr-Oliver, Incorporated.

Counter-current flow referred to herein means the addition of water to the pulp and using the water extracted juice from one screening centrifuge as the liquid vehicle for extracting juice from the pulp in a preceding screening centrifuge.

Since the price of oranges delivered into the processing plant is from 50% to 75% of the cost of production of orange juice, there has been an effort to extract more and more juice from the orange. This has led to second finishing and has resulted in obtaining an additional 3% to 5% of juice. This additional juice is lighter in color, thicker in body and more astringent in taste, and therefore, lower in quality than the first finisher juice. As efforts were made to apply more and more pressure to the second finisher to obtain a larger yield of juice, the quality became so poor that the product was unsalable.

The juice held in the orange pulp amounted to 85% of the mass, and it was known that the juice was chemically no different than the juice obtained by the extractor, and that the poor quality resulted from the extraction methods.

Efforts to obtain greater quantities of juice from the pulp were continued, and took the form of adding water and extracting the water and juice dissolved from the pulp. In this case the watered juice from one rotary or vibrating screen was used as the wash from subsequent screens in a counter-flow process. While additional juice was recovered, it contained increased amounts of pectin, flavinoids, pectinesterase and astringents, and finely comminuted solids. When the resulting product was processed by the frozen juice processors, it gelled to a solid mass in their evaporators, and jack hammers had to be used to clean the equipment. Since the orange juice industry is closely regulated by governmental commissions, the use of counter-flow extraction of orange juice is being considered by these regulatory bodies and it has been proposed to ban such processing.

Consequently, it is an object of the present invention to provide a process and apparatus by which 75% to substantially 88% of the residual juice in the pulp from the first finisher may be recovered in acceptable condition.

It is a further object of the present invention to provide a process and apparatus to obtain the juice from the pulp without releasing substantial quantities of pectin, pectinesterase, flavinoids and other astringents.

Another object of the present invention is to provide a process and apparatus by which the above objects may be carried out and the juice recovered has a high light transmittance factor.

A still further object of the present invention is to provide a process and apparatus for recovering 75% to substantially 88% of the juice held in the pulp from the first finisher which has all the characteristics of the juice from the first finisher and cannot be distinguished from first finisher juice when it is brought to the same Brix as the first finisher juice.

Other objects and advantages of the present invention will become apparent to those skilled in the art, from the following description when read in conjunction with the accompanying drawing, wherein:

FIGURE 1 is a diagram of the apparatus for carrying out the method of the present invention.

The present invention is based, in general, on the discovery that when certain definite limitations of temperature, time, and abrasion of pulp are observed in a counter-flow process, a product which is equivalent of first finisher juice is obtained when it is brought to the same Brix as the first finisher juice.

Referring to the diagram, there is shown at 10 a mixing tank to receive the pulp from the first finisher F through the conduit 11. The pulp flows from the mixing tank 10 to the first of a series of screening centrifuges 12. The juice extracted from the pulp by the centrifuge 12 is piped to the evaporator, not shown, through pipe 13. The pulp from the centrifuge 12 is delivered to the mixing tank 14, from whence it is delivered to the centrifuge 15 through conduit 16. The juice from the centrifuge 15 is piped to the mixing tank 10 by way of the pipe 17, where the juice is mixed with the pulp flowing from the first finisher, and the pulp from the centrifuge 15 is delivered to the mixing tank 18 where it is mixed with water introduced from a controlled source through the pipe 19. Since all the water added at this point in the process must be evaporated, present economics indicate that the amount of water that is added should be a ratio of 1:1 with the pulp. The water and pulp flow to the last of the screening centrifuges 20 by way of the pipe 21. The diluent juice extracted flows to the mixing tank 14 through the pipe 22, where it is mixed with the pulp from the centrifuge 12. The pulp from the centrifuge 20 which contains less than 15% of the juice originally held by it is sent to a feed mill for incorporation in cattle feed.

As stated, the present invention is based on a temperature, time and abrasion relationship within certain definite limits. The juice at no time should exceed a temperature of 70° F., regardless of other factors in the relationship. If the temperature rises to as much as 75° regardless of how fast the processing takes place or the degree of abrasion, gelation will take place in the evaporators when the juice is concentrated for concentrated frozen orange juice. The optimum temperature at which the process of the present invention may be carried out is 45° F. with the lower temperature limit being not substantially lower than 40° F. Pectin, pectinesterase, the flavinoids and bitter glucosides are substantially insoluble at a temperature of 45° F. within the time limits of the present invention. The rate of solubility rises slowly to a temperature of 70° F. but rises very sharply above this temperature; and at 75° within the time limits of presently known processing equipment, the resulting juice is rendered unacceptable.

The maximum time limit for processing the pulp from the reaming extractor E to the juice outlet 13 of the centrifuge 12 should not exceed thirty minutes, with an optimum time of less than twenty minutes.

Known counter-flow processes using rotary or vibrating screen separators have failed when put into commercial production due largely to the fact that they abrade the pulp to such an extent that the resulting "fines" pass through the screens. These "fines" contain pectin and the other undesirable elements which eventually dissolve into the juice and cause it to gell in the evaporator. It has been found that the present invention may be successfully practiced when screening centrifuges are used for separating the pulp from the juice. The screen of the centrifuge should be .015 and the helical wiper should me set at .020" clearance from the screen. Due to the high speed of separation and the minimal amount of abrasion of the pulp by the screening centrifuge two of the requirements of the present invention may be successfully met when practising the invention on a commercial basis.

The following examples of my new method for the recovery of juice from the pulp of fruits are given by way of illustration and not of limitation:

EXAMPLE 1

Orange juice from a first finisher was analyzed to determine the amounts of various factors which determine the quality of the juice.

EXAMPLE 2

Orange juice from a second finisher was likewise analyzed.

EXAMPLE 3

Ten 90-lb. boxes of oranges were reamed, and juice extracted in a reamer-extractor. The juice and pulp were pumped to a first finisher where the juice was extracted and the pulp was processed in accordance with the present invention, using three Mercone screening centrifuges, as shown in the drawing. The temperature of the pulp and juice was maintained throughout at 40° F. The extraction time in mixing tank 18 was five minutes, and the ratio of pulp to added water was 1:1. The screens of the Mercone centrifuges were .015, and the helical wiper was set for .020" clearance between the helix and the screen. The overall time was less than twenty minutes.

EXAMPLE 4

The procedure of Example 3 was followed, except that the temperature was raised to 70° F.

EXAMPLE 5

The procedure of Example 3 was followed, except that the temperature was raised to 90° F.

EXAMPLE 6

The procedure of Example 3 was followed, except that the temperature was raised to 170° F.

EXAMPLE 7

The procedure of Example 4 was followed, except that three times as much pulp as water was used.

EXAMPLE 8

The procedure of Example 7 was followed, except that three times as much water as pulp was used.

EXAMPLE 9

The procedure of Example 3 was followed, except that an FMC 35 finisher was used instead of the Mercone centrifuge. The finisher was set for a tight finish and a 0.027" screen.

EXAMPLE 10

The procedure of Example 9 was followed, except that the temperature was raised to 70° F.

EXAMPLE 11

The procedure of Example 9 was followed, except that the temperature was raised to 90° F.

EXAMPLE 12

The procedure of Example 4 was followed, except that the time of extraction in mixing tank 18 was increased to thirty minutes.

EXAMPLE 13

The procedure of Example 10 was followed, except that the time of extraction was increased to thirty minutes.

The results obtained are shown in the following table.

*Table I*

THE CHARACTERISTICS OF JUICE RECOVERED FROM ORANGE PULP FROM FIRST FINISHER

| Example No. | Brix | Acid | Acid Ratio | pH | Flavanoids,[1] mg./100 ml. | Relative Viscosity | Pulp Percent by Vol. | Pectinesterase[2] Activity | Light[3] Transmission, Percent |
|---|---|---|---|---|---|---|---|---|---|
| 1 | 10.5 | .91 | 11.6 | 3.5 | 84 | 1.00 | 8.0 | 7.7 | 32 |
| 2 | 10.6 | .90 | 11.8 | 3.8 | 224 | 1.92 | 22.0 | 61.0 | 12 |
| 3 | 5.0 | .40 | 12.0 | 3.7 | 35 | .90 | 3.0 | 3.5 | 68 |
| 4 | 5.0 | .40 | 12.0 | 3.7 | 46 | .95 | 3.0 | 3.9 | 60 |
| 5 | 5.2 | .38 | 13.7 | 3.9 | 70 | 1.31 | 5.2 | 20.2 | 47 |
| 6 | 5.3 | .35 | 15.1 | 4.0 | 166 | 1.62 | 5.5 | 1.0 | 40 |
| 7 | 8.0 | .71 | 11.3 | 3.6 | 62 | .95 | 8.0 | 7.6 | 30 |
| 8 | 2.6 | .20 | 13.0 | 3.9 | 20 | .90 | 2.0 | 2.1 | 80 |
| 9 | 5.1 | .38 | 13.4 | 3.8 | 86 | 1.16 | 10.5 | 21.8 | 31 |
| 10 | 5.4 | .31 | 17.3 | 4.0 | 112 | 1.36 | 13.0 | 36.9 | 30 |
| 11 | 6.0 | .27 | 22.2 | 4.2 | 192 | 1.51 | 13.5 | 60.0 | 20 |
| 12 | 5.2 | .37 | 14.1 | 3.8 | 65 | 1.24 | 6.0 | 18.4 | 41 |
| 13 | 5.9 | .30 | 19.7 | 3.9 | 140 | 1.42 | 9.0 | 39.2 | 17 |

[1] As Hesperidin.
[2] (PEU)/g. soluble solids×1,000.
[3] Figures are percentage light transmittance of centrifuged extracts using Lumetron 402-3 with 650 filter and 14 ml. cell.

A similar procedure was followed using pineapple pulp.

EXAMPLE 14

Pineapple juice from a first finisher was analyzed to determine the amounts of various factors which determine the quality of the juice.

EXAMPLE 15

Pineapple juice from a second finisher was similarly analyzed.

EXAMPLE 16

One thousand pounds of pineapples were crushed, and the juice and pulp were pumped to a first finisher where the juice was extracted and the pulp was processed in accordance with the present invention, using three Mercone screening centrifuges, as shown in the drawing. The temperature of the pulp and the juice was maintained throughout at 50° F. The extraction time was five minutes in mixing tank 18, and the ratio of pulp to added water was 1:1. The screens of the Mercone centrifuges were .015, and the helical wiper was set for .020" clearance between the helix and the screen. The overall time was less than twenty minutes.

EXAMPLE 17

The same procedure as in Example 16, except that the extraction was carried out at a temperature of 95° F.

*Table II*

THE CHARACTERISTICS OF JUICE RECOVERED FROM PINEAPPLE PULP

| Example | Source | Brix | Acid | Ratio | Pulp percent by Vol. | Relative Viscosity | Percent Light Transmission |
|---|---|---|---|---|---|---|---|
| 14 | 1st finisher | 13.1 | .78 | 16.8 | 12 | 1.00 | 22 |
| 15 | 2nd finisher | 13.4 | .74 | 18.1 | 46 | 2.62 | 6 |
| 16 | Water extract centrifuge at 50°. | 6.3 | .37 | 16.9 | 4 | .85 | 62 |
| 17 | Water extract centrifuge at 95°. | 6.5 | .30 | 21.7 | 8 | 1.10 | 44 |

From the foregoing examples it may be seen that time, temperature and mechanical abrasion must be controlled in order to obtain good quality juice from pulp. The temperature should be substantially in the range of 40° F. to 50° F. The time for extraction with water should be in the range of five minutes to not more than ten minutes and abrasion being maintained at a minimum by the use of screening centrifuges, rather than vibratory screens or finishers. The overall time should be in the range of about twenty minutes to not over thirty minutes. The optimum time, temperature and abrasion are as follows: Overall time from reamer to evaporator, twenty minutes; leaching time in mixing tank, five minutes; temperature about 45° F. and centrifuge type extraction with a .015 screen and wiper set at .020" from the screen.

In all cases where the pulp is extracted and separated by a "brush type" finisher, sufficient pectin and fines are incorporated in the extracted juice as to cause gelation above 40° Brix when evaporated. In all cases where the temperature of extraction has proceeded above 75° F. sufficient pectin was dissolved into the extract that concentration above 39° Brix was impossible in a conventional evaporator. When the extraction time has been delayed beyond ten minutes, the yeast build-up quickly reduces the quality of the juice recovered.

Laboratory tests conducted on apple, grape, strawberry and raspberry pulps indicate that corresponding results may be obtained in the extraction of juice from these pulps by means of the present invention.

The recovery of juice from pineapple pulp is higher than from orange pulp, since the pineapple pulp holds nearly twice as much juice as orange pulp. The bitter glucosides in pineapple juice has not been identified, and consequently, has not been shown in Table II, but it has been found that the bitterness increases with increases of temperature, time and abrasion.

Solid bowl type centrifuges are not suitable for practicing the present invention, due to the variable specific gravity of pulps of the same fruit. The solid bowl type centrifuge operates on the principle of differential gravity, rather than centrifugal force on a screen.

The present invention has been described with respect to the use of three Mercone centrifuges. However, a good extraction of juice from the pulp may be made with only two Mercone centrifuges. Thus, the centrifuge 20 and tank 18 may be omitted and the water added to the pulp in tank 14.

While there has been disclosed in the foregoing description a practical embodiment of the process and apparatus for recovery of residual juice from pulp of fruits and vegetables in accordance with the present invention, it will be understood by those skilled in the art that variations in the implementation of the concept of the invention and in the technique employed in the carrying out of the method are within the purview and scope of the invention.

What is claimed is:

1. Method of removing residual juice retained by fruit pulp after initial separation of pulp and juice, comprising: leaching the residual juice from the pulp with water in an amount sufficient to produce a ratio range from between (*a*) 1 part pulp to 3 parts water to (*b*) 3 parts pulp to 1 part water and extract a substantial amount of said residual juice from said pulp, maintaining a temperature of the mixture of pulp, residual juice and water within a range of 40° to 70° F. to prevent gelation upon concentration of the juice and also to prevent a rapid increase in solubility of the bitterness producing ingredients, centrifugally screening the pulp and diluent juice to separate the pulp from the diluent juice, and recovering the diluent juice, said method being performed on the same particular portion of pulp for a time not exceeding 30 minutes.

2. The method of claim 1, wherein the process is continuous and countercurrent and wherein the water used initially to contact the residual juice is contained in diluent juice obtained from a subsequent centrifugally screening.

3. The method of claim 1, wherein the temperature is 45° F.

References Cited in the file of this patent

UNITED STATES PATENTS

| | | |
|---|---|---|
| 2,622,797 | Nemfort | Dec. 23, 1952 |
| 2,696,440 | Ball | Dec. 7, 1954 |
| 2,779,537 | Madany | Jan. 29, 1957 |
| 2,823,126 | Little | Feb. 11, 1958 |
| 2,942,985 | Stewart | June 28, 1960 |